(12) United States Patent
Rautschek et al.

(10) Patent No.: US 6,605,183 B1
(45) Date of Patent: Aug. 12, 2003

(54) ANTIFOAM FORMULATION

(75) Inventors: Holger Rautschek, Nünchritz (DE);
Willibald Burger, Burghausen (DE);
Josef Wimmer, Burghausen (DE);
Erika Zscheile, Leckwitz (DE);
Christine Wolf, Röderau-Bobersen (DE)

(73) Assignee: Wacker-Chemie GmbH, Munich (DE)

( * ) Notice: Subject to any disclaimer, the term of this patent is extended or adjusted under 35 U.S.C. 154(b) by 113 days.

(21) Appl. No.: 09/626,960

(22) Filed: Jul. 27, 2000

(30) Foreign Application Priority Data

Aug. 2, 1999 (DE) .......................... 199 36 289

(51) Int. Cl.$^7$ .......................... C08G 77/46; B01D 19/04
(52) U.S. Cl. ...................... 162/72; 162/164.4; 516/118; 516/124; 524/261; 524/265; 524/266
(58) Field of Search ................. 516/118, 124; 162/72, 164.4; 524/261, 265, 266; 528/29; 556/444

(56) References Cited

U.S. PATENT DOCUMENTS

| | | | | |
|---|---|---|---|---|
| 2,868,824 A | * | 1/1959 | Haluska | 508/206 |
| 3,280,160 A | * | 10/1966 | Bailey | 252/74 |
| 4,028,218 A | * | 6/1977 | Fink et al. | 516/124 |
| 4,384,976 A | * | 5/1983 | Grunert et al. | 516/124 |
| 5,032,662 A | | 7/1991 | Berger et al. | 528/25 |
| 5,380,464 A | * | 1/1995 | McGee et al. | 516/118 |
| 5,523,019 A | | 6/1996 | Kim | 516/116 |
| 5,625,024 A | * | 4/1997 | Schlitte et al. | 528/29 |
| 5,844,010 A | * | 12/1998 | Burkhart et al. | 521/112 |
| 6,187,891 B1 | * | 2/2001 | Rautschek et al. | 528/15 |

FOREIGN PATENT DOCUMENTS

| | | |
|---|---|---|
| DE | 56 762 | 7/1967 |
| DE | 29 25 722 A1 | 2/1981 |
| DE | 44 11 079 A1 | 10/1995 |
| DE | 198 36 260 A1 | 2/2000 |
| DE | 199 18 361 A1 * | 10/2000 |
| EP | 0 341 952 A1 | 11/1989 |
| EP | 0 716 115 A2 | 12/1995 |
| EP | 0 896 015 A1 | 8/1998 |
| EP | 0 663 225 B1 | 11/1998 |
| JP | 8 323107 | 12/1996 |
| WO | WO 98/00216 | 1/1998 |

OTHER PUBLICATIONS

Derwent Database on EAST, week 200114, London: Derwent Publications Ltd., AN 2001–124111, DE 19918361 A1, (Wacker Chem Gmbh) abstract.*
English Derwent Abstract Corresponding To DE 198 36 260 A1, Derwent week 200018, An–2000–196266.
International Search Report—mailed Nov. 3, 2000.
English Derwent Abstract 1981–09925D[07] Corresponding To DE 09 25 722, Derwent week 1981 07.
English Derwent Abstract 1995–338247[44] Corresponding To DE 44 11 079, Derwent week 199544.
Derwent Abstract on Database Derwent on EAST, Week 199708, London, Derwent Publications Ltd, An 1997–081545, JP 08323107, (Shinetsu Chem Ind Co), Abstract.

* cited by examiner

Primary Examiner—Daniel S. Metzmaier
(74) Attorney, Agent, or Firm—Brooks & Kushman P.C.

(57) ABSTRACT

Antifoam formulations contain a siloxane antifoam and a polyether/polysiloxane copolymer of the general formula $$(R_2R^*SiO)_2(RR'SiO)_x(R_2SiO)_y(RR''SiO)_2 \qquad (I)$$

wherein R* is either R, R', or R", and wherein R' is

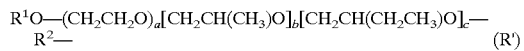
(R')

and wherein R" is

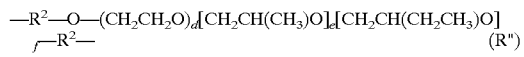
(R")

wherein R, $R^1$, $R^2$, a, b, c, d, e, f, x, y, and z are defined herein.

16 Claims, No Drawings

ANTIFOAM FORMULATION

TECHNICAL FIELD

The invention relates to antifoam formulations containing (A) antifoams based on siloxanes and (B) polyether/polysiloxane copolymers, and their use for defoaming aqueous media, in particular those obtained in pulp production.

BACKGROUND ART

In many liquid systems which contain surface-active compounds as desired or undesired components, particularly aqueous systems, problems may arise due to foam formation if these systems are contacted with gaseous substances, for example during the gassing of waste waters, during the thorough stirring of liquids, during distillation, washing or dyeing processes, or during filling operations. This foam can be controlled mechanically or by the addition of antifoams. Siloxane-based antifoams have proven particularly useful.

Antifoams based on siloxanes are prepared, for example according to DD 056 762, by heating hydrophilic silica in polydimethylsiloxanes. This process is very complicated; even so, the efficiency of the antifoams thus prepared is unsatisfactory. The distribution of hydrophobic silica in a polydimethylsiloxane, for example according to DE 29 25 722, is a more efficient process, but the effectiveness of the antifoams obtained is likewise worthy of improvement.

The use of modified polyorganosiloxanes in antifoam preparations is likewise known. Thus, the use of branched siloxane antifoams in combination with polyether/polysiloxane copolymers as antifoams, for example in pulp production, has been suggested (EP 341 952, U.S. Pat. No. 5,380,464, JP 08323107). Polyether/polysiloxane copolymers are also said to have a positive effect in combination with mineral oils as carrier oils (U.S. Pat. No. 5,523,019). WO 98/000216 discloses that siloxanes bearing dimethyl-3-hydroxypropyl-polyoxyethylenepolyoxypropylene groups are particularly suitable as surfactants in antifoam formulations.

EP 663 225 discloses crosslinked polyorganosiloxanes, which bear at least one polyether group, as one of the two components of an antifoam formulation. The crosslinking of these polyorganosiloxanes is accomplished through alkylene groups or through polydimethylsiloxanes. Through linkages via Si—C bonds, the products are stable to hydrolysis. In contrast, the process proposed in DE 44 11 079 leads to linkages via Si—O—C groups, which are not stable to hydrolysis, especially in acidic or basic media, and thus lose their efficiency in the foaming aqueous medium.

DISCLOSURE OF INVENTION

It was therefore the object of the invention to propose antifoam formulations based on siloxanes which have improved efficiency, especially in highly foaming, hot, alkaline media, which are found, for example, in pulp production. These and other objects are achieved by adding specific branched polyether/polysiloxane copolymers to known antifoams based on siloxanes.

BEST MODE FOR CARRYING OUT THE INVENTION

The invention relates to antifoam formulations based on siloxanes, containing (A) antifoams based on siloxanes and
(B) 0.1 to 40% by weight of a polyether/polysiloxane copolymer of the general formula $$(R_2R^*SiO)_2(RR'SiO)_x(R_2SiO)_y(RR''SiO)_2 \quad (I)$$

in which R, independently of one another, denote identical or different, substituted and/or unsubstituted hydrocarbon radicals having 1 to 30 carbon atoms, R* denotes either R or one of the groups R' or R"

$$R^1O\text{—}(CH_2CH_2O)_a[CH_2CH(CH_3)O]_{b[CH_2}CH(CH_2CH_3) O]_c\text{—}R^2\text{—} \quad (R') \text{ or}$$

$$\text{—}R^2\text{—}O\text{—}(CH_2CH_2O)_d[CH_2CH(CH_3)O]_e[CH_2CH(CH_2CH_3)O]_f\text{—}R^2\text{—} \quad (R'')$$

and R¹ denotes either hydrogen or an alkyl, aralkyl, aryl or R—C(O) radical, x assumes a value of 0.1 to 200, y assumes a value of 1 to 1000 and z assumes a value of 0.01 to 2.0 and a, b, c, d, e and f assume values between 0 and 1000, with the proviso that the sum (a+b+c) and the sum (d+e+f) have a value of 2 to 2000, and R² denotes an alkylene radical having 2 to 10 carbon atoms and the free valency is linked in turn to one of the groups

of a polyether/polysiloxane copolymer of the general formula (I).

The polyether/polysiloxane copolymer used is of critical importance for the efficiency of the antifoam formulation according to the invention.

Preferably, in the polyether/polysiloxane copolymer of the general formula (I), a and b assume values between 5 and 50; c, d and f assume the value 0, e assumes a value from 20 to 150, x assumes a value from 1 to 10, y assumes a value from 3 to 100 and z assumes a value from 0.5 to 1.5. R* is preferably R.

It is usual to characterize polyether/polysiloxane copolymers on the basis of their surfactant character by the turbidity point. The polyether/polysiloxane copolymers used in the antifoam formulations according to the invention preferably have a cloud point of less than 15° C., the cloud point preferably being determined in a solution which contains 10% by weight of the copolymer and 25% by weight of diethylene glycol monobutyl ether in water. This furthermore means that the polyether/polysiloxane copolymer used need not dissolve in water at room temperature to form a clear solution.

The preparation of the polyether/polysiloxane copolymers of the general formula (I) which are liquid at room temperature is effected, for example, by reacting (ba) organosilicon compounds of the general formula $$(R_2R^{**}SiO)_2(HRSiO)_{x+z}(R_2SiO)_y \quad (III)$$

in which R and x, y and z have the abovementioned meaning and R** denotes either R or H, (bb) organic compounds of the general formula $$R^1\text{—}O\text{—}(CH_2CH_2O)_a[CH_2CH(CH_3)O]_b[CH_2CH(CH_2CH_3)O]_c\text{—}R^5 \quad (IV)$$

and (bc) organic compounds of the general formula $$R^5\text{—}O\text{—}(CH_2CH_2O)_d[CH_2CH(CH_3)O]_e[CH_2CH(CH_2CH_3)O]_f\text{—}R^5 \quad (V)$$

in which R¹, a, b, c, d, e and f have the abovementioned meaning and R⁵ is an alkenyl group of the formula —$C_mH_{(2m-1)}$ having 2 to 10 carbon atoms, m assuming a value from 3 to 10, preferably 3, e.g. a vinyl or allyl group, the ratio of the number of Si—H functions in formula (III) to the number of alkenyl groups $R^5$ in the formulae (IV) and (V) being less than or equal to 1 and the reaction being carried out in the presence of a catalyst promoting hydrosilylation reactions.

Compounds of the general formula (III) are flowable siloxanes whose viscosity is determined by the sum of the average number of HRSiO and $R_2SiO$ groups in the molecule. These compounds and their synthesis are generally known. For example, the polyorganosiloxanes of the general formula (III) which contain hydrogen functional groups and have a random distribution of H—Si bonds can be prepared by cohydrolysis of methyl chlorosilanes, for example from $MeSiHCl_2$, $Me_2SiHCl$, $Me_2SiCl_2$, $Me_3SiCl$ and $MeSiCl_3$. Furthermore, it is possible to obtain polyorganosiloxanes having hydrogen functional groups by acidic equilibration of hexamethyldisiloxane and mixtures of different cyclic compounds, for example cyclic methylhydrogensiloxanes and cyclic dimethylsiloxanes, or by equilibration of linear oligomeric and/or polymeric siloxanes, one reactant having pendent and optionally also terminal Si—H groups.

In the general formulae (I) and (III), preferred radicals R are alkyl radicals having 1 to 6 carbon atoms such as methyl, ethyl, n-propyl, isopropyl, butyl or hexyl, or longer-chain alkyl radicals such as octyl, decyl, dodecyl or octadecyl; cyclic hydrocarbon radicals such as cyclopentyl, cyclohexyl or cyclooctyl radicals; aromatic hydrocarbon radicals such as aryl groups, for example, phenyl, naphthyl, styryl and cumyl radicals. Furthermore, the hydrocarbon groups may be modified by halogens or other substituents, such as, for example, 3,3,3-trifluoropropyl, chloromethyl, cyanoethyl and 4-chlorophenyl. Particularly preferred radicals R are methyl groups.

The sum (x+z) in the general formula (III) assumes, for example, values between 1.1 and 202, preferably between 1.5 and 11.5. The —HRSiO— groups are randomly distributed over the molecule. The value of y in the general formula (III) is usually 1 to 1000, preferably 3 to 100.

The organic compounds of the general formulae (IV) and (V) are termed polyethers or polyoxyalkylene polymers. This group of compounds is known. Usually, they are prepared by polymerization of ethylene oxide and/or propylene oxide and/or butylene oxide, it being possible for the alkylene oxide units to be either randomly distributed or present as block copolymers. The polyethers of the general formulae (IV) and (V) can be prepared from only one alkylene oxide or by copolymerization of two or three of said alkylene oxides. Depending on the process, random copolymers or block copolymers are obtained, random polyethers being preferred. The polyethers of the general formulae (IV) and (V) which are used for the preparation of the polyether/polysiloxane copolymers contained in the antifoam formulations according to the invention have at least two polyoxyalkylene units, usually not more than 200 polyoxyalkylene units, and preferably not more than 150 polyoxyalkylene units. The radical $R^1$ in the general formulae (I) and (IV) is, for example, ethyl, n-propyl, isopropyl, hexyl, decyl, dodecyl, or 2-phenylethyl, preferably hydrogen, methyl, butyl, or acetyl.

The amounts by weight of the compounds (III), (IV) and (V) which are used for the preparation are chosen according to the desired polyether/polysiloxane copolymer of the general formula (I) and enable a person skilled in the art to control in a simple manner the average molecular weight and the viscosity and to establish the desired requirements accordingly. The amounts by weight of compound (IV) and compound (V) used and the molecular ratios established thereby determine the coefficients x and z in the general formula (I).

The compounds of the general formulae (III), (IV) and (V) are reacted in the presence of catalysts promoting hydrosilylation reactions, the ratio of the number of Si—H groups in the compound of the general formula (III) to the number of terminal alkylene groups originating from the compounds of the general formulae (IV) and (V) being less than or equal to 1. If the compounds of the general formulae (III), (IV) and (V) are not miscible with one another or if the mixing viscosity is too high, it is expedient to use a solvent or a solubilizer. Aprotic solvents, e.g. benzene, xylene or saturated hydrocarbons may be used. Aromatic solvents such as toluene are preferably used for this purpose.

Preferred catalysts which promote hydrosilylation reactions are compounds or complexes of metals of the 8th subgroup of the Periodic Table of the Elements, in particular those of platinum and of rhodium, e.g. the platinum compound known as a Speier catalyst (hexachloroplatinic acid dissolved in isopropanol), with or without the addition of further solvent; the so-called Lamoreaux catalyst (hexachloroplatinic acid in ethanol), the Karstedt catalysts (vinylsiloxane-platinum complexes) and the Wilkinson catalyst (vinylsiloxane-platinum-chlorotriphenylphosphine complex). It is possible to fix the hydrosilylation catalyst on a support, e.g. in colloidal form on active carbon. Furthermore, known inhibitors such as alkynols, can be used for controlling the reaction rate. The hydrosilylation catalysts are used in concentrations of 0.1 to 100 ppm, preferably 2 to 50 ppm, most preferably from 4 to 20 ppm, based on the total amount of starting materials.

The temperatures useful during the preparation of the polyether/polysiloxane copolymers may be as high as 300° C. Temperatures of 50 to 120° C. are preferred. The reaction time is generally between 1 min and 20 h. The conversion can be determined from the amount of hydrogen which can be eliminated under basic conditions from unconverted Si—H groups. The reaction is complete when eliminable hydrogen is no longer detectable or the concentration of the residual hydrogen can no longer be further reduced.

The antifoam formulations according to the invention preferably contain (A) 1 to 90% by weight of antifoam based on siloxanes, (B) 0. 1 to 20% by weight of the polyether/polysiloxane copolymer of the general formula (I), (C) 0 to 20% by weight, preferably 2 to 20% by weight, of emulsifiers, (D) water, preservatives, thickeners, and (E) further additives.

Usually, a mixture of silica and polyorganosiloxanes is used as the antifoam based on siloxanes (also referred to below as siloxane antifoams), the mixture preferably containing (aa) 1 to 15% by weight of a precipitated and/or pyrogenic silica rendered hydrophobic in situ and having a BET surface area greater than 50 $g/m^2$ and/or a pretreated, hydrophobic, precipitated and/or pyrogenic silica having a BET surface area greater than 50 $g/m^2$;

(ab) 20 to 99% by weight of one or more polyorganosiloxanes of the general formula

$$R^3_m(R^4O)_n SiO_{(4-n-m)/2} \tag{II}$$

in which $R^3$, independently of one another, denote identical or different, substituted and/or unsubstituted saturated and/ or unsaturated hydrocarbon radicals having 1 to 30 carbon atoms; and $R^4$, independently of one another, denote hydrogen or substituted and/or unsubstituted saturated and/or unsaturated hydrocarbon radicals having 1 to 30 carbon atoms; n has an average value of less than 0.5 and the sum (n+m) has a value from 1.8 to 2.4;

(ac) 0 to 10% by weight of a silicone resin which essentially comprises units of the general formula $R^3SiO_{1/2}$ and $SiO_{4/2}$, and (ad) 0 to 80% by weight of an organic compound having a boiling point greater than 100° C., selected from mineral oils, natural oils, isoparaffins, polyisobutylenes, residues from the oxoalcohol synthesis, esters of low molecular weight synthetic carboxylic acids, ethers of low molecular weight alcohols, phthalates and esters of phosphoric acid.

The rendering of silicic acid (aa) hydrophobic in situ can be effected by heating the silica dispersed in the polyorganosiloxane (ab) to temperatures of 100 to 200° C. for several hours. The reaction can be promoted by the addition of catalysts, such as KOH, and of water repellants, such as short-chain OH-terminated polydimethylsiloxanes, silanes, silazanes or silicone resins. As an alternative, pretreated silicas rendered hydrophobic may be used, or a combination of silicas rendered hydrophobic in situ with pretreated silicas rendered hydrophobic.

A preferred polyorganosiloxane (ab) is in particular one in which the radicals $R^3$ in the general formula (II) are unsubstituted, branched or straight-chain alkyl groups, for example methyl, ethyl, propyl, isopropyl, hexyl, 2-ethylhexyl, octyl or dodecyl groups, substituted alkyl groups such as trifluoropropyl, cyanoethyl, glycidyloxypropyl, polyalkyleneglycolpropyl, aminopropyl or aminoethylaminopropyl groups, unsaturated radicals such as vinyl, methacryloyloxypropyl or allyl radicals, aromatic radicals such as phenyl, tolyl, xylyl, naphthyl, anthracyl or benzyl radicals. Particularly preferred radicals $R^3$ are methyl or phenyl groups, it being particularly preferred that more than 80 mol % of the radicals $R^3$ are methyl groups.

Examples of compounds of the formula (II) are polydimethylsiloxanes having viscosities at 25° C. of 100 to 1,000,000 mPas. These polydimethylsiloxanes may be branched or partially crosslinked, for example by the incorporation of $MeSiO_{3/2}$ or $SiO_{4/2}$ units. These branched or partially crosslinked siloxanes then have viscoelastic properties.

Such branched viscoelastic polyorganosiloxanes can be obtained, for example, by reacting the dimethyldichlorosilane hydrolysis product or hydroxyl-terminated polydimethylsiloxane with a trimethylsilyl-terminated polydimethylsiloxane and a compound selected from a silane having at least three hydrolyzable groups, such as tetraethoxysilane, methyltrimethoxysilane or methyltri-acetoxysilane, or a silicone resin which is essentially composed of $(CH_3)_3SiO_{1/2}$ and $SiO_2$ units in the ratio from 2:1 to 1:2, in the presence of a catalyst.

A further variant for the preparation of branched viscoelastic polyorganosiloxanes is the reaction of an organosiloxane A having on average less than two randomly distributed functional groups per molecule, with an organosiloxane B having on average more than two randomly distributed functional groups per molecule, in each case only one type of functional group being present per siloxane A or B, the reaction taking place in the presence of a catalyst promoting hydrosilylation, for example, platinum or platinum compounds.

Furthermore, the antifoam based on siloxanes may contain 0.1 to 10% by weight, preferably 0.5 to 5% by weight, of at least one polyorganosiloxane (ac) of the general formula (II), in which $R^3$ denotes a methyl radical and $R^4$ denotes a linear and/or branched hydrocarbon radical having at least 6 carbon atoms, n assumes a value from 0.005 to 0.5 and the sum (n+m) assumes a value from 1.9 to 2.1. Such products are obtainable, for example, by alkali-catalyzed condensation of silanol-terminated polydimethylsiloxanes having a viscosity of 50 to 50,000 mPas and aliphatic alcohols having more than 6 carbon atoms, such as isotridecyl alcohol, n-octanol, stearyl alcohol, 4-ethylhexadecanol or eicosanol.

In the antifoam formulations according to the invention, further known additives or auxiliaries may be present, for example further fillers such as alumina, metal soaps, quartz powder which has been rendered hydrophobic or finely divided hydrophobic polyurethanes. However, it is also possible to add substances acting as antifoam oils, such as mineral oils, liquid paraffins, fatty esters, fatty alcohols and waxes in amounts of 1 to 99% by weight, based on the total weight of the formulation. Furthermore, compounds such as polyacrylic acid, polyacrylates, cellulose ethers such as carboxymethylcellulose and hydroxyethylcellulose, natural gums such as xanthan gum, and polyurethanes, may be added as thickeners.

The antifoam formulation according to the invention is prepared by known processes, for example with the use of high shear forces in colloid mills or rotor-stator homogenizers. The mixing process can be carried out at reduced pressure in order to avoid mixing in air, which is contained in finely divided fillers.

The use of antifoam formulations according to the invention in oil-in-water emulsions (O/W emulsions) is preferred. Although the specific polyether/polysiloxane copolymers used in the antifoam formulations according to the invention have surfactant properties, they are not suitable as emulsifiers for the formation of oil-in-water emulsions, starting from antifoams based on siloxanes. If they are used as emulsions, the antifoam formulations therefore additionally contain emulsifiers, capable of forming O/W emulsions based on siloxanes. The poly-siloxane/polyether copolymer can be emulsified together with the antifoam or can simply be added after the preparation of the emulsion, since they are not required for the formation of the emulsion but, as an active ingredient, increase efficiency of the antifoam formulation.

The antifoam formulations according to the invention in the form of O/W emulsions, preferably contain 5 to 50% by weight of antifoam based on siloxanes, 0.1 to 10% by weight of polyether/polysiloxane copolymer of the general formula (I), 2 to 20% by weight of an emulsifier, and water, preservatives, thickeners and further additives.

The emulsifiers required for the preparation of the emulsions may be anionic, cationic or nonionic and are known to a person skilled in the art for the preparation of stable silicone emulsions. Emulsifier mixtures are preferably used, and at least one nonionic emulsifier, such as, for example, sorbitan fatty esters, ethoxylated sorbitan fatty esters, ethoxylated fatty acids, ethoxylated linear or branched alcohols having 10 to 20 carbon atoms and/or glyceryl esters, should be present.

Techniques for the preparation of silicone emulsions are known. Usually, the preparation is carried out by simple stirring of all components and subsequent homogenization using rotor-stator homogenizers, colloid mills or high-pressure homogenizers.

The antifoam formulations according to the invention are used wherever troublesome foam formation occurs in processes and needs to be reduced or completely eliminated. Examples are the use in detergents and cleaning agents, the control of foam in waste water treatment plants, in textile dyeing processes, in the scrubbing of a natural gas, in dispersions and in hydrocarbons.

In particular, the antifoam formulations according to the invention can be used in an outstanding manner for defoaming aqueous media obtained in pulp production.

EXAMPLES

All parts and percentages stated below are (unless stated otherwise) based on weight. The viscosities relate to 25° C.

A) Preparation of the Siloxane Antifoams

A1: 94 parts of polydimethylsiloxane having a viscosity of 12,500 mm$^2$/s and 6 parts of hydrophilic silica were (calculated as platinum) of Speier catalyst. The solvent was removed in vacuo (100 Pa). In the products obtained, less than 5 ppm of hydrogen which can be eliminated under basic conditions was detectable.

BC1: In Comparative Example BC1, a polydimethylsiloxane which was terminated at both ends by dimethylvinylsilyloxy groups was used instead of a diallylpolyether. However, this siloxane had to be added last since otherwise gelling of the product occurred.

BC2 and BC3 were prepared analogously to B1–B9, except that no diallylpolyether was used.

TABLE 1

| | Structure of the polyether/polysiloxane copolymers (according to formula (I), R = R* = methyl) | | | | | | | | | |
|---|---|---|---|---|---|---|---|---|---|---|
| Example | R$^1$ | x | y | z | a | b | c | d | e | f | TP in ° C. |
| B1 | CH$_3$ | 4 | 50 | 1 | 0 | 25 | 0 | 0 | 50 | 0 | 2 |
| B2 | H | 5 | 38 | 0.8 | 0 | 0 | 15 | 10 | 0 | 10 | <1 |
| B3 | C$_4$H$_9$ | 4 | 50 | 1 | 24 | 24 | 0 | 0 | 50 | 0 | 8 |
| B4 | C$_4$H$_9$ | 5.6 | 700 | 1.4 | 24 | 24 | 0 | 0 | 75 | 0 | <1 |
| B5 | C$_4$H$_9$ | 5.6 | 4 | 1.4 | 24 | 24 | 0 | 0 | 75 | 0 | 45 |
| B6 | H | 4 | 50 | 1 | 7 | 28 | 0 | 20 | 80 | 0 | 15 |
| B7 | C$_4$H$_9$ | 4.4 | 50 | 0.6 | 24 | 24 | 0 | 0 | 130 | 0 | 3 |
| B8 | C$_4$H$_9$ | 3.2 | 8 | 0.8 | 10 | 0 | 0 | 0 | 130 | 0 | 23 |
| B9 | H | 5 | 75 | 1 | 0 | 3 | 0 | 0 | 75 | 0 | <1 |
| BC 1 | C$_4$H$_9$ | 4 | 50 | 1 | 24 | 24 | 0 | linked to siloxane instead of polyether | | | <1 |
| BC 2 | C$_4$H$_9$ | 5 | 50 | 0 | 24 | 24 | 0 | 0 | 0 | 0 | 48 |
| BC 3 | C$_4$H$_9$ | 3.4 | 39 | 0 | 16 | 13 | 0 | 0 | 0 | 0 | 52 | homogenized three times using a colloid mill (3.6 mm gap). The silica was rendered hydrophobic in situ by heating the mixture to 190° C. for 10 hours. A2: 400 parts of a hydroxyl-terminated polydimethylsiloxane having a viscosity of 65 mm$^2$/s, 40 parts of trimethylsilyloxy-terminated polydimethylsiloxane having a viscosity of 40 mm$^2$/s, 4 parts of methyltrimethoxysilane and 1 part of 0.5% strength phosphonitrile chloride catalyst were heated to 100° C. The pressure was reduced to 35 mbar in the course of 20 minutes. Thereafter, the catalyst was neutralized with 0.03 part of triisooctylamine. The polyorganosiloxane obtained had a viscosity of 19,000 mm$^2$/s. 5 parts of a pretreated hydrophobic silica were incorporated into 95 parts of this oil and homogenized using a colloid mill.

A3: A mixture of 89.3 parts of a trimethylsiloxy-terminated polydimethylsiloxane having a viscosity of 5,000 mm/s, 5 parts of a pyrogenic hydrophilic silica having a BET surface area of 300 m$^2$/g, 0.7 part of a 20% strength methanolic KOH, 2.5 parts of a silicone resin comprising 40 mol % of trimethylsilyloxy units and 60 mol % of SiO$_{4/2}$ units and 2.5 parts of a siloxane which was prepared by condensation of eicosanol with a hydroxyl-terminated polydimethylsiloxane having a viscosity of 65 mm$^2$/s were heated to 150° C. for 2 h. After cooling, the mixture was homogenized using a colloid mill.

B) Preparation of the Polyether/polysiloxane Copolymers

B1 to B9: In accordance with the structure stated in Table 1 below, the Si—H-containing siloxane polymer of the formula (III), the diallylpolyether of the formula (IV) and the monoallylpolyether of the formula (V) were mixed in toluene as solvent. A 5% stoichiometric excess of unsaturated allyl groups relative to the Si—H group was used. This mixture was refluxed for 3 h in the presence of 10 ppm TP is the point which was determined using an aqueous solution which contained 10% by weight of the polyethylene glycol/polysiloxane copolymer and 25% by weight of diethylene glycol monobutyl ether.

C) Preparation and Testing of the Antifoam Formulations

Testing of the efficiency (black liquor rest):

400 ml of black liquor (hardwood from the processing of birch) were thermostatted at 80° C. for 15 min in a 1 l graduated cylinder with wash bottle attachment. After the addition of 10 mg of organosilicon polymers (the sum of silicone antifoam A and polyether/polysiloxane copolymer B) in the form of the prepared antifoam formulation, the black liquor was circulated at a rate of 2.3 l/min and, whenever (3 times altogether) a foam height of 30 cm had been reached in the graduated cylinder, 5 mg of silicone were immediately added (25 mg of silicone altogether). The time t between the beginning of the test and the time after the last addition when the foam had again risen to 30 cm was measured. The longer this period t, the more efficient the antifoam.

C1: The preparation of the antifoam formulations C11 to C13, CC11 and CC12 (comparative examples) was carried out by simple mixing of 90 parts of the antifoam based on siloxanes and 10 parts of the polyether/polysiloxane copolymer using a laboratory dissolver. For the test, a mixture of 20 parts of this antifoam formulation and 80 parts of a mixture of aliphatic hydrocarbons having a viscosity of 3 mm$^2$/s and a flash point >100° C. was prepared using a laboratory dissolver at 1000 min$^{-1}$.

C2: For the preparation of the antifoam formulations C21 to C27 and CC21 to CC23 (comparative examples), 20 parts of siloxane antifoam, 5 parts of sorbitan monostearate, 5 parts of polyethylene(40) stearate and 5 parts of polyether/ polysiloxane copolymer were mixed at 70° C. 10 parts of a 1% strength solution of xanthan gum, preserved with 0.5% of formaldehyde, were stirred in using an extensive stirrer at 600 min$^{-1}$. 55 parts of water were added in portions in the course of 3 minutes and stirring was continued for 15 min at 1000 min$^{-1}$.

C3: For the preparation of the antifoam formulations C31 to C33 and CC31 and CC32 (comparative examples), 20 parts of siloxane antifoams, 4 parts of polyoxyethylene(4) stearate and 2 parts of polyoxyethylene(40) stearate were mixed at 70° C. 69 parts of water were added in portions in the course of 10 minutes. Finally, 5 parts of polyether/polysiloxane copolymer were added to the emulsion obtained and stirring was continued for 15 min at 1000 min$^{-1}$.

Formulations and test results are summarized in Table 2.

| Example | Silicone antifoam | Polyether/ polysiloxane copolymer | Black liquor test, t in s |
|---|---|---|---|
| C11 | A3 | B3 | 1200 |
| C12 | A2 | B2 | 1850 |
| C13 | A3 | B7 | 1560 |
| CC11 not according to the invention | A3 | none | 450 |
| CC12 not according to the invention | A3 | BC2 | 620 |
| C21 | A1 | B1 | 1120 |
| C22 | A2 | B3 | 2530 |
| C23 | A3 | B4 | 3410 |
| C24 | A1 | B5 | 1070 |
| C25 | A1 | B6 | 1360 |
| C26 | A1 | B8 | 1020 |
| C27 | A1 | B9 | 1590 |
| CC21 not according to the invention | A1 | none | 410 |
| CC22 not according to the invention | A1 | BC1 | 590 |
| CC23 not according to the invention | A1 | BC2 | 480 |
| C31 | A1 | B3 | 1350 |
| C32 | A2 | B3 | 1920 |
| C33 | A3 | B3 | 2110 |
| CC31 not according to the invention | A3 | none | 540 |
| CC32 not according to the invention | A3 | BC2 | 790 |

The substantially improved efficiency of the antifoam formulations according to the invention compared with the prior art (comparative examples) is evident from the substantially higher values for t.

Repetition of the antifoam test in a softwood black liquor (pine) confirmed the outstanding efficiency of the antifoam formulations according to the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An antifoam formulation containing
   (A) at least one antifoam based on siloxanes and
   (B) 0.1 to 40% by weight of a polyether/polysiloxane copolymer of the formula $$(R_2R^*SiO)_2(RR'SiO)_x(R_2SiO)_y(RR''SiO)_z \qquad (I)$$

in which R, independently of one another, denote identical or different, optionally substituted hydrocarbon radicals having 1 to 30 carbon atoms, R* denotes either R, R' or R"; wherein R' and R" are:

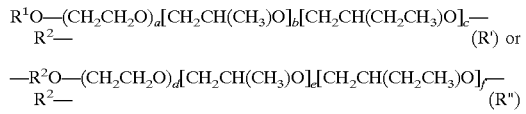

where $R^1$ denotes either hydrogen, an alkyl, aralkyl, aryl or R—C(O) radical, x is on average 0.1 to 200, y is 1 to 1000, z is on average 0.01 to 2.0, and a, b, c, d, e and f have values between 0 and 1000, with the proviso that the sum (a+b+c) and the sum (d+e+f) each have a value of 2 to 2000, $R^2$ denotes an alkylene radical having 2 to 10 carbon atoms, R" is the divalent linking group in common with a group RR"SiO, or when R* is R", the group $R_2R"SiO$ in a first polyether/polysiloxane copolymer of the formula (I) and with a group RR"SiO or $R_2R"SiO$ in a second polyether/polysiloxane copolymer of the formula (I) such that said first and second polyether/polysiloxane copolymers (I) are linked together by an R" bridging unit, the antifoam based on siloxanes (A) and the polyether/polysiloxane copolymer (B) being different.

2. The antifoam formulation of claim 1, wherein a and b are between 5 and 50; c, d, and f are 0, e is from 20 to 150, x is from 1 to 10, y is from 3 to 100, and z is from 0.5 to 1.5.

3. The antifoam formulation of claim 1, wherein the polyether/polysiloxane copolymer of the formula (I) has a cloud point of less than 15° C.

4. The antifoam formulation of claim 1, comprising
   (A) 1 to 90% by weight of antifoam based on siloxanes,
   (B) 0.1 to 20% by weight of a polyether/polysiloxane copolymer of the formula (I),
   (C) 0 to 20% by weight of emulsifiers and
   (D) water, and optionally preservatives, thickeners and further additives.

5. The antifoam formulation as claimed in claim 4, wherein 2 to 20% by weight of emulsifiers are present.

6. The antifoam formulation as claimed in claim 4, wherein at least one emulsifier is selected from the group consisting of sorbitan fatty esters, ethoxylated sorbitan fatty esters, ethoxylated fatty acids, ethoxylated linear alcohols having 10 to 20 carbon atoms, ethoxylated branched alcohols having 10 to 20 carbon atoms, and glyceryl esters.

7. The antifoam formulation of claim 1, wherein said at least one antifoam based on siloxanes comprises a mixture of silica and a polyorganosiloxane.

8. In the process of pulp production where an antifoam is added to defoam aqueous media, the improvement comprising adding to said aqueous media the antifoam formulation of claim 1.

9. In the process of pulp production where an antifoam is added to defoam aqueous media, the improvement comprising adding to said aqueous media the antifoam formulation of claim 2.

10. In the process of pulp production where an antifoam is added to defoam aqueous media, the improvement comprising adding to said aqueous media the antifoam formulation of claim 3.

11. In the process pulp production where an antifoam is added to defoam aqueous media, the improvement comprising adding to said aqueous media the antifoam formulation of claim 4.

12. In the process of pulp production where an antifoam is added to defoam aqueous media, the improvement comprising adding to said aqueous media the antifoam formulation of claim 6.

13. An antifoam formulation containing
(A) at least one antifoam based on siloxanes and
(B) 0.1 to 40% by weight of a polyether/polysiloxane copolymer of the formula $$(R_2R^*SiO)_2(RR'SiO)_x(R_2SiO)_y(RR''SiO)_z \qquad (I)$$

in which R, independently of one another, denote identical or different, optionally substituted hydrocarbon radicals having 1 to 30 carbon atoms, R* denotes either R, R' or R"; wherein R' and R" are:

$$R^1O\!-\!(CH_2CH_2O)_a[CH_2CH(CH_3)O]_b[CH_2CH(CH_2CH_3)O]_c\!-\!R^2\!- \qquad (R') \text{ or}$$

$$-\!R^2O\!-\!(CH_2CH_2O)_d[CH_2CH(CH_3)O]_e[CH_2CH(CH_2CH_3)O]_f\!-\!R^2\!- \qquad (R'')$$

where $R^1$ denotes either hydrogen, an alkyl, aralkyl, aryl or R—C(O) radical, x is on average 0.1 to 200, y is 1 to 1000, z is on average 0.01 to 2.0, and a, b, c, d, e and f have values between 0 and 1000, with the proviso that the sum (a+b+c) and the sum (d+e+f) each have a value of 2 to 2000, $R^2$ denotes an alkylene radical having 2 to 10 carbon atoms,
R" is the divalent linking group in common with a group RR"SiO, or when R* is R", the group $R_2$R"SiO in a first polyether/polysiloxane copolymer of the formula (I) and with a group RR"SiO or $R_2$R"SiO in a second polyether/polysiloxane copolymer of the formula (I) such that said first and second polyether/polysiloxane copolymers (I) are linked together by an R" bridging unit, the antifoam based on siloxanes (A) and the polyether/polysiloxane copolymer (B) being different, wherein said at least one antifoam based on siloxanes comprises a mixture of
(aa) 1 to 15% by weight of at least one precipitated silica rendered hydrophobic in situ and having a BET surface area greater than 50 g/m², a pyrogenic silica rendered hydrophobic in situ and having a BET surface area greater than 50 g/m², and/or a pretreated, hydrophobic precipitated and/or pyrogenic silica having a BET surface area greater than 50 g/m²,
(ab) 20 to 99% by weight of one or more polyorganosiloxanes of the formula $$R^3{}_m(R^4O)_nSiO_{(4-n-m)/2} \qquad (II)$$

in which $R^3$ independently is an identical or different, optionally substituted, saturated or unsaturated hydrocarbon radical having 1 to 30 carbon atoms, and $R^4$ independently is hydrogen or an optionally substituted, saturated or unsaturated hydrocarbon radical having 1 to 30 carbon atoms, n has an average value of less than 0.5 and the sum (n+m) has a value from 1.8 to 2.4,
(ac) 0 to 10% by weight of a silicone resin comprising units of the formula $R^3SiO_{1/2}$ and $SiO_{4/2}$, and
(ad) 0 to 80% by weight of at least one organic compound having a boiling point greater than 100° C., selected from the group consisting of mineral oils, natural oils, isoparaffins, polyisobutylenes, residues from the oxoalcohol synthesis, esters of low molecular weight synthetic carboxylic acids, ethers of low molecular weight alcohols, phthalates, and esters of phosphoric acid.

14. The antifoam formulation of claim 13, wherein the antifoam based on siloxanes contains at least one polyorganosiloxane of the formula (II), in which $R^3$ denotes a methyl radical and $R^4$ denotes a linear or branched hydrocarbon radical having at least 6 carbon atoms, n is from 0.005 to less than 0.5 and the sum (n+m) is from 1.9 to 2.1.

15. In the process of pulp production where an antifoam is added to defoam aqueous media, the improvement comprising adding to said aqueous media the antifoam formulation of claim 13.

16. In the process of pulp production where an antifoam is added to defoam aqueous media, the improvement comprising adding to said aqueous media the antifoam formulation of claim 14.

* * * * *